July 28, 1959 P. HODSON 2,896,921
ROTARY REGENERATIVE AIR PREHEATER
Filed May 2, 1955 2 Sheets-Sheet 1

INVENTOR.
Peter Hodson
BY
Wayne H. Lang
AGENT

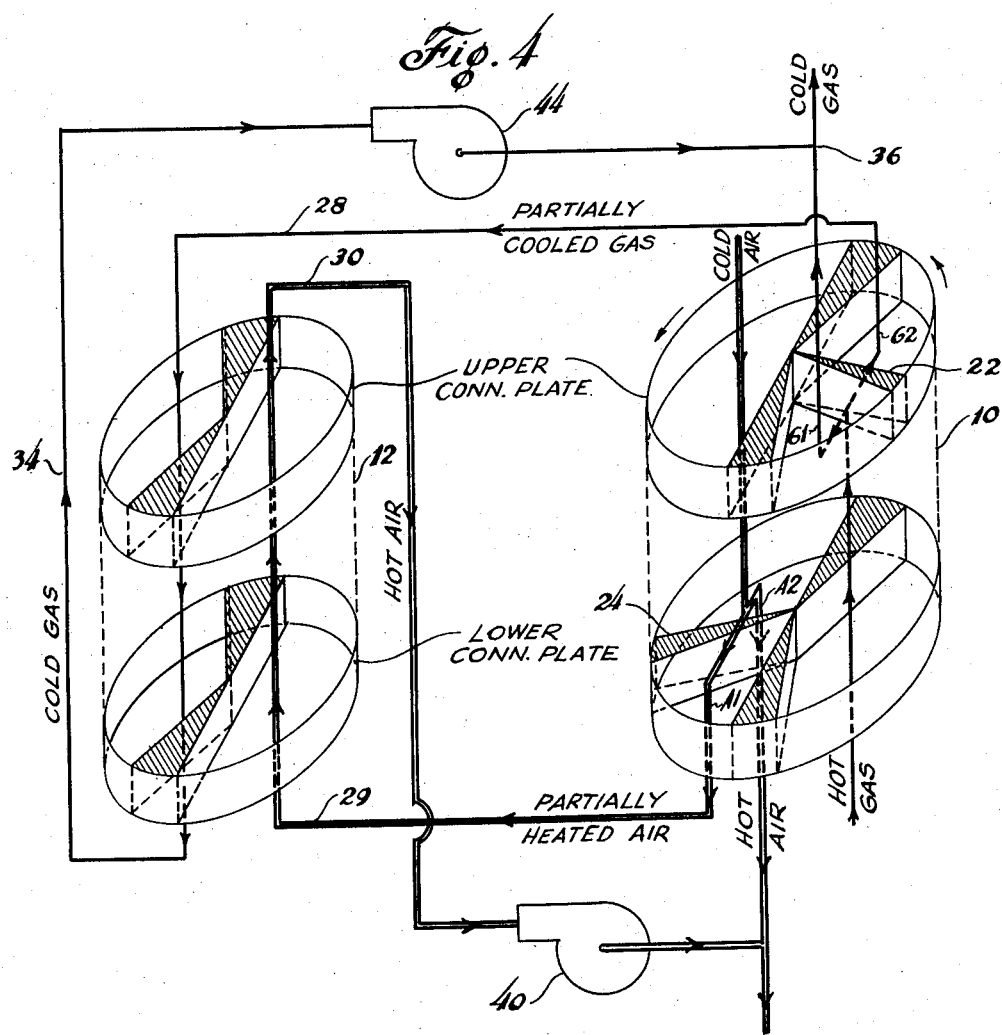

United States Patent Office 2,896,921
Patented July 28, 1959

2,896,921

ROTARY REGENERATIVE AIR PREHEATER

Peter Hodson, Wellsville, N.Y., assignor to The Air Preheater Corporation, New York, N.Y., a corporation of New York Application May 2, 1955, Serial No. 505,206

3 Claims. (Cl. 257—6)

This invention relates to an arrangement for increasing the operating efficiency of an air preheating system or the like, and it relates especially to an arrangement whereby the temperature of exit gas leaving an air preheater of the rotary regenerative or cross-flow type may be materially reduced so as to effectively improve the operating efficiency thereof.

To obtain low exit gas temperatures in a rotary regenerative air preheater, it is often necessary to use heat exchange plates of relatively large dimension in the direction of fluid flow since the temperature head between the inlet and the outlet fluids at both hot and cold ends of the air preheater must be reduced to a minimum. However, with normal operating speeds for a rotary regenerative air preheater, the heating elements or plates are never cooled as low as the temperature of the inlet air nor are they heated as high as the temperature of the inlet gas. This temperature difference permits little range of temperature within the heating element and, consequently, results in a retarded rate of heat transfer between the inlet gas and the heat transfer element, and then between the heat transfer element and the inlet air.

In a normally operated rotary regenerative air preheater having a rotor speed of from 2 to 3 r.p.m. the temperature of the heat transfer elements ranges between the temperature extremes of the cool inlet air and the hot inlet gas. If however, the rotor of the preheater were to rotate at a comparatively slow rate of speed, the elements carried thereby would be subjected to the fluid temperature extremes for a longer period so the metal temperature thereof would tend to approach more closely the fluid temperatures in the ducts.

The principal object of this invention is therefore to provide a preheater arrangement which affords a low exit gas temperature without necessitating the use of extremely large, deep units.

Figure 1:
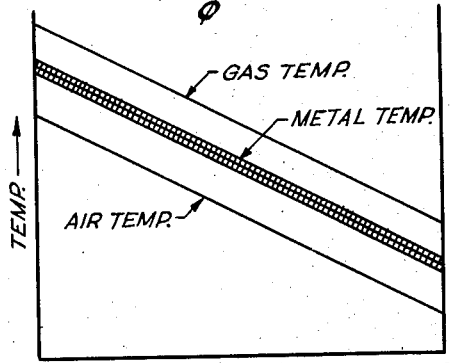

The application of this arrangement to an air preheater will be better understood upon reference to the accompanying drawings in which:

Figure 1 graphically illustrates the gas and air temperatures of a normally operated preheater with reference to the temperature variations of the heat transfer element.

Figure 2:
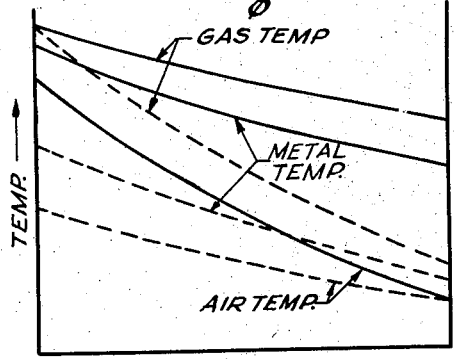

Figure 2 graphically illustrates the gas and air temperatures in a rotary air preheater as it is rotated at a relatively slow speed.

Figure 3:
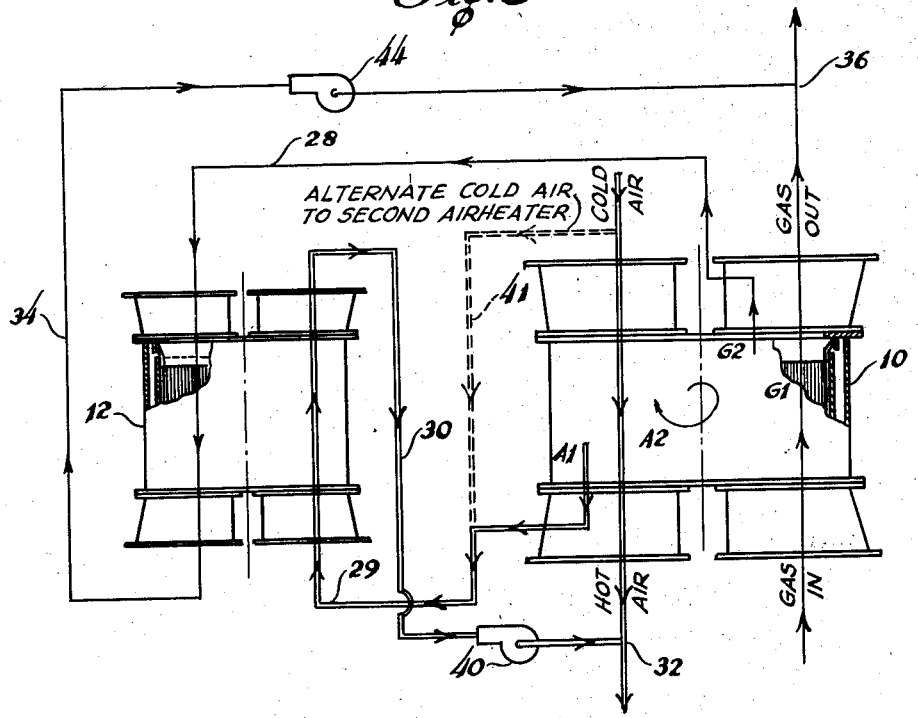

Figure 3 schematically illustrates in side elevation an air preheater system involving this invention.

Figure 4 is a phantom drawing showing the sector or end plates at opposite ends of the preheaters with the intervening preheater structure omitted.

A rotary air preheater of the usual type is arranged to rotate on its axis at from 2 to 3 r.p.m. so as to provide gas, air and heat absorbing element temperatures which closely approximate the curve indicated in Figure 1. The metal temperature variations as indicated by the shaded area amounts to from 20 to 30 degrees F. at any point on the heating element during movement thereof with the rotor.

When a rotary air preheater is arranged to turn on its axis at a rate corresponding to a fractional part of its normal rate of rotation, the metal temperature of the heat exchange elements more nearly approaches the extreme temperature of the hot exhaust gases on one side and the cold inlet air on the other. Figure 2 illustrates this condition and in addition shows how the temperature of the gas and air varies within their respective passageways. For example, the temperature of the gas at the hot end of the rotor is at a constant value, but as it flows through the rotor a portion thereof which contacts the cool heat exchange elements just being rotated into the gas duct (illustrated in Figure 3 as portion G1) is cooled substantially more than the gas which passes over the heated elements and is discharged shortly before the elements rotate from the gas side (illustrated in Figure 3 as portion G2) into the air side.

A similar condition obtains on the air side of the air preheater where cold air enters at a uniform temperature but contacts heat exchange elements at various temperatures so that a portion thereof is heated to a relatively high temperature (indicated at A1) while the temperature of a portion (A2) contacting the previously cooled elements is increased to a lesser degree.

In accordance with this invention a slowly rotating rotary air preheater is combined with an air preheater rotating at a normal rate so as to impart greater efficiency to the heat recovery cycle by permitting an extremely low gas exit temperature.

The rotor of the first preheater 10, at the right of Figure 3, rotates at a speed substantially less than the rotor of the second preheater 12, at the left. The gas outlet of preheater 10 is divided into two separate sections by an imperforate sector plate 22 (Figure 4) which divides the outlet gas stream into a section G1 of fully cooled gas and a section G2 of partially cooled gas. The air outlet stream is similarly divided by a sector plate portion 24 into a section A1 of partially heated air and a fully heated section A2.

The partially cooled gas flowing from section G2 of the first preheater retains a substantial amount of its original heat content and it is therefore directed through a duct 28 to a second air preheater 12 where it flows in heat exchange relationship with the partially heated air educted from the section A1 of the first preheater 10 and supplied to the second preheater 12 via a duct 29. While passing through the second preheater 12 the partially cooled fluid from section G2 of the first preheater gives up a large portion of its remaining heat to the relatively cool fluid before it leaves the preheater via a duct 34 and is moved by an auxiliary gas fan 44 to a junction 36 with the cool gas discharged from section G1 of the first preheater 10. The air which is heated in preheater 12 leaves via a duct 30 and is moved by an auxiliary air fan 40 into a junction 32 with heated air or other fluid flowing from preheater 10.

It is to be understood that gas and air outlet ducts from the first air preheater may be variously proportioned to impart the proper temperatures to the fluids flowing therethrough. In a similar respect the air side of the first preheater may be reduced in size and a portion of the cool inlet air may be ducted directly to a second air preheater as shown by duct 41 of Figure 3.

What I claim is:

1. In an air preheater arrangement for transferring heat from a stream of heating fluid to a stream of air or other fluid to be heated, a first and second rotary regenerative air preheater each having spaced passageways for a heating fluid and air or other fluid to be heated; sector plates at opposite ends of each preheater having spaced ports for said streams of heating fluid and fluid to be heated, the ports sustaining fluid flow from the first preheater being radially divided into a plurality of sections separating the heating fluid and the fluid to be heated into hot and relatively cool fluid streams; and ductwork directing the hot heating fluid and the relatively cool air from the first preheater to the spaced passageways of said second air preheater.

2. An air preheater arrangement as defined in claim 1 wherein the first air preheater is rotated at a speed substantially slower than said second air preheater.

3. An air preheater arrangement as defined in claim 1 wherein air leaving said second air preheater after having absorbed heat from the heating fluid flowing therethrough is mixed with the hot air leaving said first air preheater.

References Cited in the file of this patent
UNITED STATES PATENTS

| | | |
|---|---|---|
| 1,586,817 | Ljungstrom | June 1, 1926 |
| 1,970,127 | Colby et al. | Aug. 14, 1934 |
| 2,347,857 | Waitkus | May 2, 1944 |
| 2,582,830 | Hawley | Jan. 15, 1952 |
| 2,594,471 | Marshall | Apr. 29, 1952 |
| 2,607,564 | Yerrick | Aug. 19, 1952 |
| 2,795,401 | Cooper et al. | June 11, 1957 |